April 28, 1953  M. B. HERBRICK  2,636,534
CROSS LINK CONTROLLED LOCK FOR TIRE CHAIRS
Filed March 10, 1949  2 SHEETS—SHEET 1
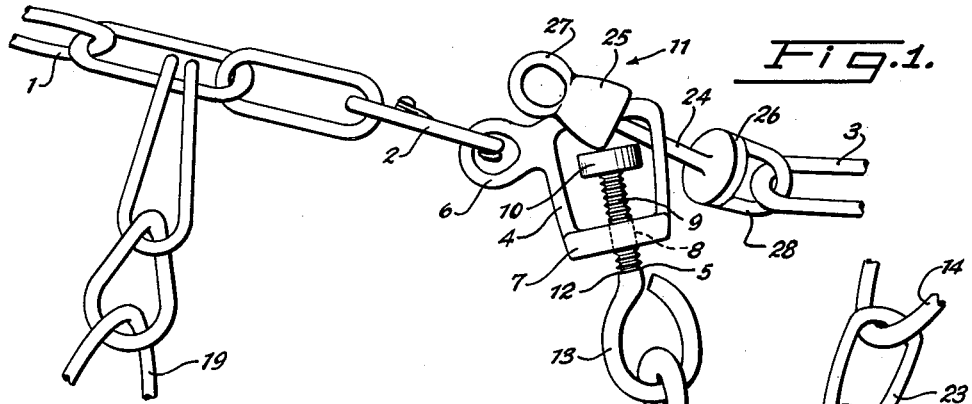
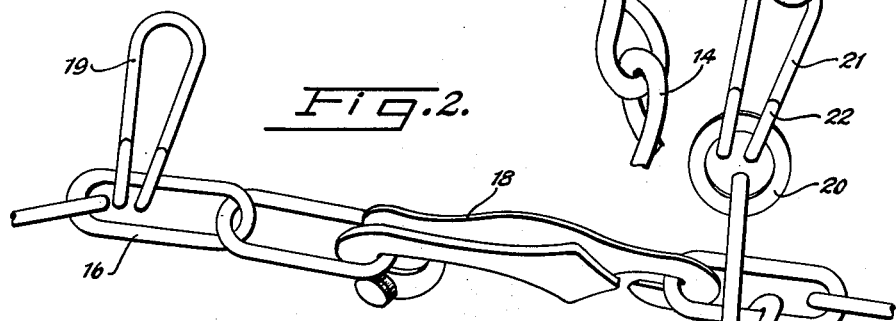
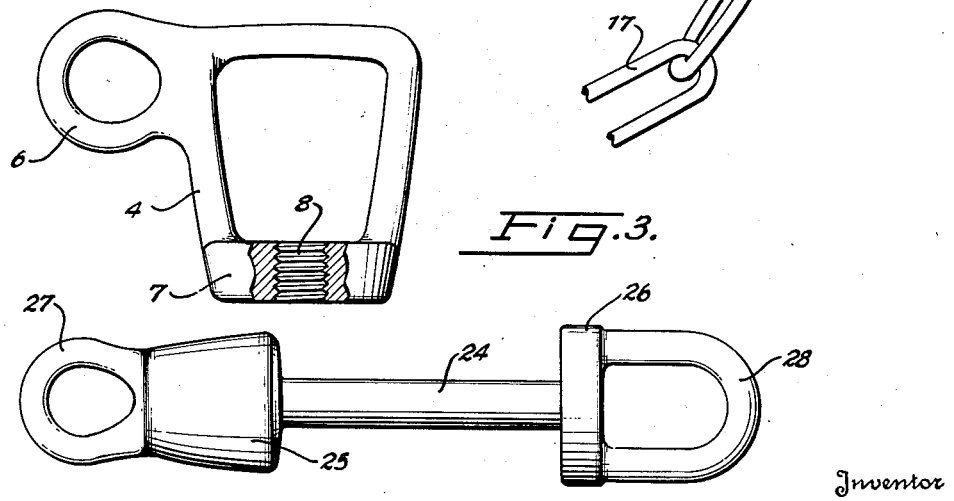
Inventor
MILTON B. HERBRICK.
By Shoemaker & Mattare
ATTORNEY

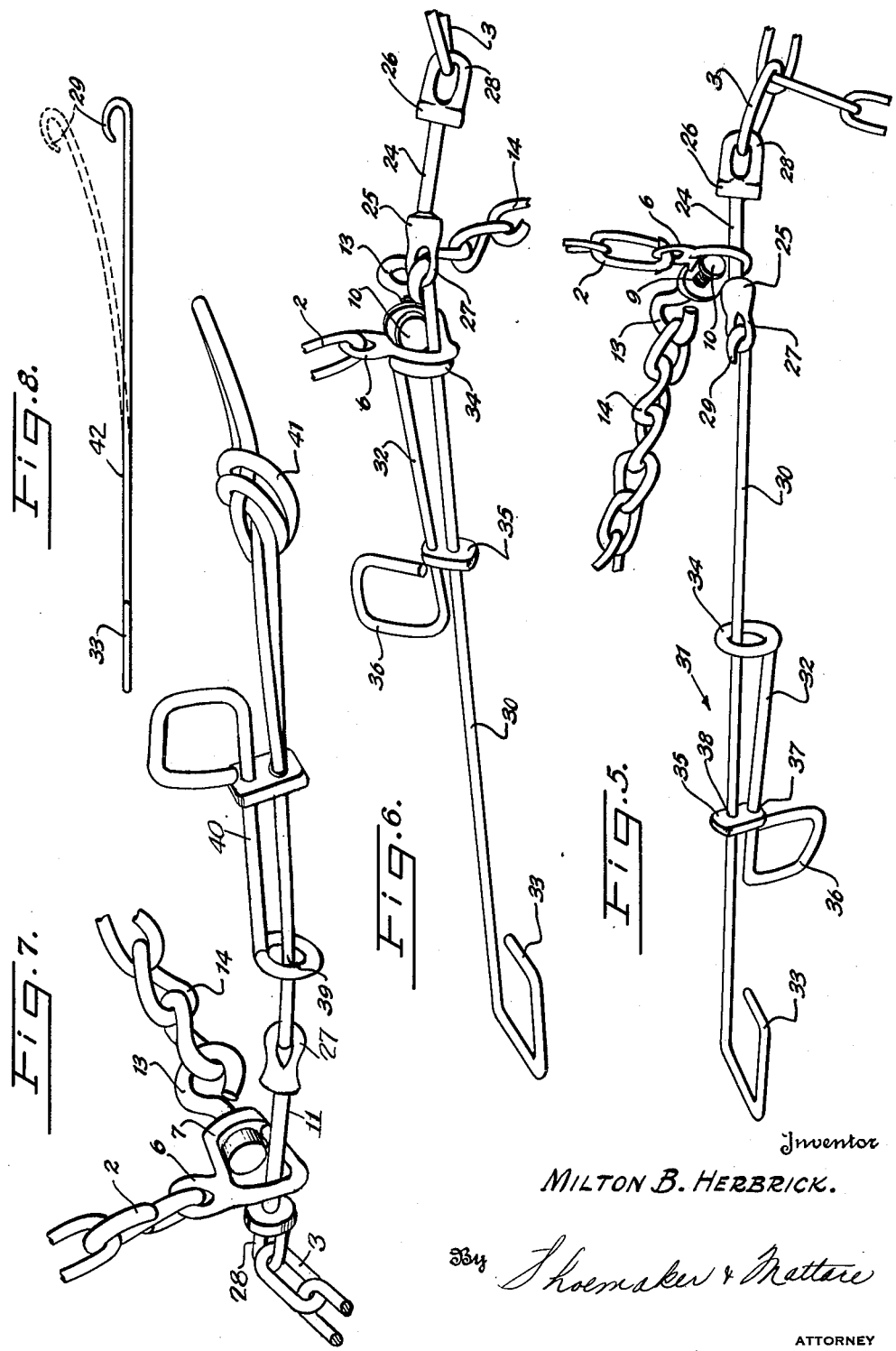

Patented Apr. 28, 1953

2,636,534

UNITED STATES PATENT OFFICE 2,636,534

CROSS LINK CONTROLLED LOCK FOR TIRE CHAINS

Milton B. Herbrick, Sterling, Colo.

Application March 10, 1949, Serial No. 80,736

7 Claims. (Cl. 152—213)

1

The invention relates to improvements in stringers for tensioning tire chains and to cross link controlled locking means for securing tensioned tire chains.

An object of the present invention is to provide a tire chain having its inner side chain split to form two end portions and provided at one end portion with a clamp slidably receiving the other end portion of the inner side chain and adapted to be operated by a cross chain for locking the inner side chain under tension after the same has been stretched to the desired degree, and capable also of being operated to release the adjusted portion of the inner side chain to slacken the same and to permit the tire chain to fall free from the wheel on which it is mounted when the outer side chain is released in the customary manner.

It is also an object of the invention to provide a clamp having a loop or frame attached to one end portion of the inner side chain and a rotary clamping member having a threaded connection with the loop or frame and adapted to be rotated by the controlling cross chain for moving the clamping member into engagement with the adjustable end portion of the inner side chain after the same has been tensioned and to release the inner adjustable end portion when it is desired to remove the tire chain from the tire.

Another object of the invention is to provide a clamp controlling cross chain secured at one end to the rotary member of the clamp and adapted to have one end portion of the outer side chain pass through one of its end links for holding it against rotary movement whereby the clamp controlling cross chain may be readily connected with the outer side chain without interfering with the ordinary mid-line fastener employed for connecting the end portions of the outer side chain.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a detail perspective view of a portion of the tire chain illustrating the manner of clamping the adjustable end portion of the inner side chain;

Fig. 2 is a similar view illustrating the manner

2 of securing the outer end of the clamp controlling cross chain to the outer side chain;

Fig. 3 is a detail view of the loop or frame of the clamp, the flattened inner end being in section;

Fig. 4 is a detail view of the end link of the adjustable end of the inner side chain;

Fig. 5 is a perspective view of a portion of the tire chain having the stringer applied thereto, the sliding member of the stringer being at the outer portion thereof;

Fig. 6 is a similar view showing the slidable member in engagement with the clamp for enabling the stringer to exert a pulling and pushing action on the inner side chain;

Fig. 7 is a perspective view illustrating another form of stringer in which the slidable member is arranged on a flexible member consisting of a rope or cord;

Fig. 8 is a detail view of another form of the invention in which the main tensioning member is constructed of flexible metal.

In the accompanying drawings, 1 designates the inner side chain of a tire chain divided to provide end portions 2 and 3. The end portion 2 is provided with a clamp comprising a loop or frame 4 and a rotary clamping member 5 which is adapted to clamp the other end portion 3 of the inner side chain after the latter has been tensioned to the desired degree by the means hereinafter described.

The loop or frame 4 is substantially rectangular and slightly oblong and is provided at one side adjacent the outer end thereof with an eye or ring 6 which is linked into the adjacent link of the end portion 2 of the inner side chain. The inner end 7 of the loop or frame of the clamp is slightly enlarged and flattened and provided with a central threaded opening 8 which is engaged by threads 9 of the rotary member 5 of the clamp.

The rotary member 5, which extends through the opening 8 of the inner end 7 of the loop 4 is provided at its inner end with a head 10 which is adapted to engage an end link 11 of the adjustable end portion 3 of the inner side chain for clamping the adjustable end portion 3 for holding the inner side chain under tension. The outer end of the threaded shank or straight portion 12 of the rotary member of the clamp is provided with an eye 13 which is linked into the adjacent link of a clamp controlling and operating cross chain 14 which extends across the tire to the outer side thereof. The rotary member of the clamp is held against rotary movement by the outer side chain 16 which passes through one of a plurality of end links 17 of the clamp controlling and operating cross chain 14. The outer side chain 16 is provided with an ordinary mid-line fastener 18 which may be of any desired construction and as the particular construction of the mid-line fastener does not constitute a portion of the present invention, detail illustration and description thereof are deemed unnecessary.

The tire chain is provided at intervals with other cross chains 19 which have their end links liked into the inner and outer side chains in the usual manner.

The clamp controlling cross chain 14 may be provided adjacent the end links 17 with a ring 20 and an elongated link 21 composed of two sides and an end connecting portion, the terminal portions of the sides being bent into hooks 22 which engage the ring 20. The elongated link 21 is linked into an adjacent link 23 and the hook-shaped terminals 22 securely retain the ring 20 which is flattened at its side faces and affords free movement of the end links 17 for connection with the end portion of the outer side chain 16.

The end link 11 of the adjustable end portion 3 of the inner side chain consists of a straight stem 24 and heads 25 and 26 which are provided with eyes 27 and 28. The eye 28, which is located at the inner end of the stem 24, is linked into the adjacent link of the end portion 3 of the inner side chain and the outer eye 27 is adapted to be engaged by a hook 29 of a main tensioning member 30 of a stringer 31, after the link 11 has been inserted in the loop 4 of the clamp and protrudes therefrom, as illustrated in Figs. 5 and 6 of the drawings.

The main tensioning member 30 consists of a rod on which is mounted a slidable member 32 and the said rod 30 is provided at its outer end with a suitable handle 33 to enable it to be readily gripped for drawing the end portion 3 of the inner side chain through the loop 4 of the clamp. The slidable member 32 which is shown at the outer portion of the rod 30 in Fig. 5 of the drawings, is adapted to be moved along said rod and engaged with the loop 4 of the clamp, as illustrated in Fig. 6 of the drawings, whereby the stringer operates with a double action to pull the end portion 3 of the inner side chain through the loop of the clamp and to push the loop of the clamp over the links of said end portion 3 of the inner side chain. This will enable the inner side chain to be readily stretched to the desired tension by both the pulling and pushing action and will, during the tensioning of the inner side chain, maintain the same in proper position with relation to the inner side wall of the tire and prevent the inner side chain from being pulled outwardly over the tread portion of the tire.

The slidable pushing member 32 consists of a short rod provided at spaced points with a ring 34 and a slide 35, both of which extend laterally from the slidable member and receive the main tensioning member or rod 30. The slidable push member 32 is provided at the outer end with a handle or grip 36. The handles or grips 33 and 36 preferably consist of substantially rectangular loops formed by bending the outer terminal portions of the members of the stringer, as shown. The ring 34 is of a size to pass over the links of the end portion 3 of the inner side chain, which links are adapted to pass readily through the ring 34 as the latter is pushed over the end portion 3 in tensioning the inner side chain. The slide 35 consists of a plate or block of metal having at its inner end an opening 37 to receive the rod or member 32 and is provided at its outer portion with an opening 38 which is of a diameter to permit the slide to move freely over the rod 30. The block or plate which forms the slide 35 may be secured to the rod or member 32 by spot welding or any other suitable means.

In Fig. 7 of the drawings the main tensioning member is shown in the form of a rope or cord 39 which is doubled and linked into the eye 27 of the end link 11 of the end portion 3 of the inner side chain. The rope or cord 39 has mounted on it a slidable member 40 constructed and operating the same as the slidable member 32. The terminals of the doubled rope or cord are knotted at 41 and constitute a handle portion or grip for enabling the end portion 3 to be pulled through the clamp while the latter is pushed over the links of the end portion 3 by slidable pusher member of the stringer.

Instead of employing a rope or cord, a flexible metallic member 42 may be used and which may be flexed as illustrated in dotted lines in Fig. 8 of the drawings in the operation of the device. A small chain or any other form of main tensioning stringer member may be substituted for the rod 30. When the doubled rope is employed, it is adapted to be pulled out by one end without reaching back of the wheel.

No claim is made in the present application to the stringer illustrated in Figs. 5 to 8, inclusive.

I claim:

1. A tire chain including an inner side chain divided to form two end portions, and a clamp comprising a frame connected to one end portion of the inner side chain and of a size to receive and have passed through it the other end portion of the inner side chain, and a cross chain controlled clamping member having a threaded connection with the frame and arranged to engage said other end portion of the inner side chain and rotatable by said cross chain to move it into and out of engagement with said other end portion of the inner side chain.

2. A tire chain including an inner side chain divided to form two end portions, and a clamp comprising an approximately rectangular frame located at said end portions of the inner side chain and extending inwardly from the inner side chain and provided on its outer portion at one side thereof with an eye linked into one end portion of the inner side chain, said frame being provided in its inner portion with a threaded opening and being of a size to receive and have passed through it the other end portion of the inner side chain, and a rotary clamping member extending through and having threaded engagement with the threaded opening of the frame and arranged to engage said other end portion of the inner side chain and rotatable for moving it into and out of engagement with the same.

3. A tire chain including an inner side chain divided to form two end portions, and a clamp comprising an approximately rectangular frame located at said end portions of the inner side chain and extending inwardly and provided on its outer portion at one side with an eye linked into one end portion of the inner side chain, said frame being provided in its inner portion with a threaded opening and being of a size to receive and have passed through it the other end portion of the inner side chain, a rotary clamping member extending through and having a threaded connection with the threaded opening of the frame and provided at one end with a head for engaging said other end portion of the inner side chain and having an eye at the other end, and a cross chain linked into the eye of the rotary clamping member and operable to rotate the same to move the rotary clamping member into and out of engagement with said other end portion of the inner side chain.

4. A tire chain including an inner side chain divided to form two end portions, and a clamp comprising an approximately rectangular frame located at said end portions of the inner side chain and extending inwardly and provided on its outer portion at one side with an eye linked into one end portion of the inner side chain, said frame being provided in its inner portion with a threaded opening and being of a size to receive and have passed through it the other end portion of the inner side chain, a rotary clamping member extending through and having a threaded connection with the threaded opening of the frame and provided at one end with a head for engaging said other end portion of the inner side chain and having an eye at the other end, a cross chain linked into the eye of the rotary clamping member and operable to rotate the same to move the rotary clamping member into and out of engagement with said other end portion of the inner side chain, and an outer side chain extending through a link of the cross chain for maintaining the rotary clamping member in engagement with said other end portion of the inner side chain.

5. A tire chain including an inner side chain divided to form two end portions, a clamp comprising a frame having an eye on one end linked into one end portion of the inner side chain, said frame being provided in its other end with a threaded opening and a rotary clamping member extending through and having a threaded connection with the threaded opening of said frame, and an end link comprising a stem, heads located at the ends of the stem and eyes extending from said heads, one of the eyes being linked into the other end portion of the inner side chain and the head at the other end of said stem being of a size to pass through the frame and be engaged by the rotary member thereof.

6. A tire chain including an inner side chain divided to form two end portions, a clamp comprising an oblong frame provided on one end with an eye linked into one of the end portions of the inner side chain, said frame being provided in the other end with a threaded opening and a rotary clamping member extending through and having a threaded engagement with the threaded opening of the frame and provided at one end with a head located within the frame, said rotary clamping member being provided at its other end with an eye, an end link secured to the other end portion of the inner side chain and composed of a stem, heads located at the ends of the stem, and eyes carried by said heads, one of the eyes being linked into said other end portion of the inner side chain and the head at the other end of the stem being of a size to pass through the frame and be engaged by the head of the rotary clamping member, and a cross chain linked into the eye of the rotary clamping member and adapted to be operated to rotate the rotary clamping member and move the same into and out of engagement with said head of the end link of said other end portion of the inner side chain.

7. A tire chain including an inner side chain divided to form two end portions, a clamp comprising an oblong frame provided on one end with an eye linked into one of the end portions of the inner side chain, said frame being provided in the other end with a threaded opening and a rotary clamping member extending through and having a threaded engagement with the threaded opening of the frame and provided at one end with a head located within the frame, said rotary clamping member being provided at its other end with an eye, an end link secured to the other end portion of the inner side chain and composed of a stem, heads located at the ends of the stem, and eyes carried by said heads, one of the eyes being linked into said other end portion of the inner side chain and the head at the other end of the stem being of a size to pass through the frame and be engaged by the head of a rotary clamping member, a cross chain linked into the eye of the rotary clamping member and adapted to be operated to rotate the rotary clamping member and move the same into and out of engagement with said head of the end link of said other end portion of the inner side chain, and an outer side chain extending through a link of said cross chain and maintaining the rotary clamping member in engagement with said head of the end link of said other end portion of the inner side chain.

MILTON B. HERBRICK.

References Cited in the file of this patent

UNITED STATES PATENTS

| Number | Name | Date |
| --- | --- | --- |
| 1,642,732 | Holt | Sept. 20, 1927 |
| 1,674,691 | Marsh | June 26, 1928 |
| 2,436,715 | Everline | Feb. 24, 1948 |
| 2,472,828 | Herbrick | June 14, 1949 |